United States Patent

Patrick

[15] 3,655,130
[45] Apr. 11, 1972

[54] SPRAYING SYSTEM

[72] Inventor: Keith H. Patrick, Montgomery, Ala.
[73] Assignee: Ring Around Products, Inc.
[22] Filed: June 4, 1970
[21] Appl. No.: 43,352

Related U.S. Application Data

[63] Continuation-in-part of Ser. No. 686,425, Nov. 28, 1967, Pat. No. 3,552,650.

[52] U.S. Cl. ............................239/77, 239/127, 239/142, 239/168, 239/172, 239/216, 239/222, 261/88
[51] Int. Cl. .................................................B05b 3/12
[58] Field of Search ................239/7, 8, 77, 78, 124, 127, 239/142, 160, 162, 172, 176, 167, 168, 222, 216, 223, 224, 567, 168; 261/30, 88

[56] References Cited

UNITED STATES PATENTS

| | | | |
|---|---|---|---|
| 2,979,269 | 4/1961 | Bals | 239/222 X |
| 3,472,454 | 10/1969 | Blue et al. | 239/77 |
| 1,725,581 | 8/1929 | Hendricks | 239/142 X |
| 3,507,336 | 4/1970 | Nelson | 239/191 X |
| 2,910,245 | 10/1959 | Burroughs | 239/167 |
| 2,939,636 | 6/1960 | Mullin | 239/216 X |
| 3,341,126 | 9/1967 | Fish | 239/78 |
| 3,398,893 | 8/1968 | Missimer et al. | 239/77 |
| 3,552,650 | 1/1971 | Patrick | 239/216 X |

*Primary Examiner*—M. Henson Wood, Jr.
*Assistant Examiner*—Michael Y. Mar
*Attorney*—Newton, Hopkins & Ormsby

[57] ABSTRACT

This invention relates to an improved spraying system for spraying fluid chemicals. The improved spraying system includes a supply means for containing a supply of fluid chemicals and a series of spraying heads for spraying chemicals on foliage or a crop to be sprayed. Each of the spraying heads includes an annular diffusion member and a rotatable impeller means for developing a uniform blast of directed air pressure over the outer surface of the diffusion member. A dispensing nozzle is operatively associated with each of the spraying heads for dispensing a quantity of fluid chemicals into the diffusion member to be directed by centrifugal force out through the diffusion member into the blast of air. The dispensing nozzles are coaxially mounted and extend through the rotatably driven impeller means. A supply pump is operatively associated with the supply means and the dispensing nozzles for delivering a supply of fluid chemicals under pressure to the dispensing nozzles. A hydraulically driven motor means is operatively associated with each of the spraying heads and includes a driving gear coaxially mounted relative to the dispensing nozzle, the diffusion member and the rotatable impeller means. A hydraulic pump means is operatively associated with the motor means for delivering hydraulic fluid under pressure for operation of the motor means. The improved spraying system is designed for being utilized on a plurality of supporting vehicle frameworks. One of the supporting vehicles includes a trailer having a movably mounted boom for supporting a series of the spraying heads for movement in a vertical plane between operative and inoperative positions. A second supporting means includes a framework having connectable members which will permit the framework to be connected to conventional three point hitch provided on a supporting vehicle. A third type of supporting framework includes a transverse mast having a pair of laterally extending booms which are adapted to be swung about vertical axis from laterally extending positions to fore and aft positions. Each of the laterally extending booms is detailed for supporting at least one spraying head.

23 Claims, 17 Drawing Figures

Patented April 11, 1972

INVENTOR
KEITH PATRICK

BY Newton, Hopkins
& Ormsby

ATTORNEYS

Patented April 11, 1972 3,655,130

Patented April 11, 1972

SPRAYING SYSTEM

REFERENCE TO RELATED APPLICATION

This application is a continuation-in-part of a co-pending application Ser. No. 686,425 filed Nov. 28, 1967, now U.S. Pat. No. 3,552,650 for a "Fluid Dispensing Mechanism."

BACKGROUND OF THE INVENTION

In the past, various instruments have been devised for dividing liquids and for distribution of the same over relative wide areas. Such devices have found wide application in creating fogs for the destruction of various pests such as mosquitos, flies, boll weevil insects, fungi and bacteria. Such instruments may also be advisable in distributing liquid fertilizers.

The prior art devices have either distributed relative large volumes of liquid or have been relatively complicated and expensive. One such mechanism involved the generation of high temperature gases which pass at high velocity through a nozzle and entrain the liquid so that the liquid is also discharged at a high velocity from the nozzle. Of course in finely dividing the liquid and subjecting it to the relatively high temperatures, there may be a breakdown of the chemicals in the liquid to be dispensed. Therefore, while such mechanisms are quite effective in discharging relatively large volumes of liquid, their uses may be limited especially when organic halogens are to be dispensed or where a small quantity of liquid per acre is to be dispensed.

Other types of prior art liquid spraying mechanisms have been used, and some have attempted to discharge low and ultra low volumes of finely divided liquids. Such machines known as the Fischer and Hahn machines, employ the carburetor principal using a large volume of compressed air at low pressure. Another type of machine is known as the John Blu machine and works on the principal of blowing a large volume of air across spray nozzles which discharge fine sprays into the blast of air.

Various liquids, such as liquid fertilizers, which may be dispensed with such mechanisms, are quite corrosive and therefore, may attack the mechanisms, particularly where small orifices are involved. Therefore, maintenance of such prior art devices is a major factor and is at times expensive.

Spraying systems as above identified usually employ various structural framework for supporting the spray heads in position for effecting a spraying operation. However, most of the prior art supporting frameworks were extremely heavy, complicated in their construction and unreliable in operation. Further, in the prior art devices which utilize a rotatable impeller means for developing directed streams of air pressure, the drive means for effecting rotation of the rotatable impeller means was often complex in nature which created extensive service and repair problems.

In the supporting means provided in the prior art spraying device, the spraying heads would usually be supported at a remote distance from the objects to be sprayed especially in groves and orchards and the location of the prior art spray heads did not permit the spray material to be released in proper relationship to the foliage to insure a sufficient application thereof.

Most of the prior art spraying apparatus did not include means for adequately controlling the application rate of the fluid chemicals to be sprayed. Thus, such spraying devices would not be suitable for use in a variety of chemicals to be applied to various types of crops or foliage.

SUMMARY OF THE INVENTION

The present machine is different both in structure and method of operation from the prior art discussed above. It has an annular perforated member which, upon rotation, functions as a diffuser and a slinger for chopping the liquid into finely divided form and then slinging it radially outward for entrainment in a stream or blast of air.

Briefly described, the present invention, which is believed to obviate the problems described above, includes a motor, preferably a hydraulic motor, which rotates an impeller and annular perforated member. The annular member is a symmetrical housing, the surface of which is formed by a screen of perforated web. The liquid to be dispensed is passed by a central dispensing nozzle through the interior of the motor and is discharged into the central interior of the annular member, as the annular member is rotated about its axis such that the liquid will be directed by centrifugal force out through the annular perforated member. Circumferentially spaced blades project in radial directions from the annular member so that, as the housing is rotated, the blades create an upwardly diverging uniform discharge of air which passes over the peripheral surface of the screen.

The nozzle is detailed in construction to include a series of orifices which will direct the fluid chemicals downwardly in a direction toward the rotatable impeller means and passing eventually through the peripheral screen which forms a secondary diffuser and also acts as an accelerator which carries the liquid into an orbital path at such a velocity that the liquid, in fine droplet form, is slung by centrifugal force radially into the air blast. By controlling the speed of rotation, the particle size of the liquid is controlled and by controlling the amount of liquid passing through the nozzle the volume discharge rate may be varied as desired. Indeed, quite small volumes of liquid can be adequately entrained in quite large volumes of air and distributed over large areas.

The improved spraying system of the present invention includes basically three types of support means for supporting the series of spraying heads in positions to effect a spraying operation of fluid chemicals at a proper location relative to the crops or foliage to be sprayed. The first type of support system includes a trailing type vehicle supported on a pair of wheels and includes a boom structure containing a series of spraying heads. The boom structure is pivotally mounted for movement in a vertical plane between an operative position to an inoperative position. The second type of support frame means includes a framework for supporting a supply tank and having connectable elements which are detailed to be connected to conventional three point connections on a supporting vehicle. The supporting means for the second type of spraying system includes a framework for supporting a series of spraying heads at a series of selectively adjustable spraying positions. The third type of support means includes a supporting mast having a pair of laterally extending boom means for supporting a series of spraying heads. The supporting mast includes connectable means adaptable to be connected to conventional Hy-Boy type support vehicle.

OBJECTS OF THE INVENTION

It is a primary object of this invention to provide a spraying system which is capable of distributing a very, very small quantity of liquid over a large area.

Another object of this invention is to provide a liquid spraying means in which the particle size of the spraying liquid may be readily and easily varied.

Still another object of this invention is to provide a liquid spraying mechanism which would evenly and finely divide liquid and entrain it in a flow of air so that the liquid may be deposited over a relatively wide area.

A further object of this invention is to provide a liquid spraying system which may be readily and easily arranged to operate in conjunction with other similar mechanisms.

A still further object of this invention is to provide a liquid spraying system which consists of a series of liquid spraying means operative in conjunction with each other to discharge liquid in a finely divided form over a relatively wide area.

Another object of this invention is to provide a liquid spraying system in which both the particle size and the rate at which the liquid is sprayed may be varied independently of each other.

Still another object of this invention is to provide a liquid spraying system which may be readily and easily disassembled and reassembled for cleaning purposes.

A still further object of this invention is to provide a spraying head for use in a spraying system which is simple in construction, economical to manufacture and reliable in operation.

A further object of this invention is to provide a spraying system including a series of spraying heads for dispensing a chemical liquid to be sprayed over a wide area.

A still further object of this invention is to provide supporting means for supporting the spraying system and for handling a series of spraying heads.

Another object of this invention is to provide a spraying system which is easily adapted to be utilized in various vehicular support means for adapting the spraying system to a wide variety of operations.

Another object of this invention is to provide a series of spraying heads which are supported for movement between an operating and inoperating position.

A still further object of this invention is to provide a spraying system having a hydraulic control drive means for the spraying heads.

A still further object of this invention is to provide a spraying system having a supporting framework wherein the supporting framework includes hydraulic supply conduits as an integral part of the structural reinforcing framework wherein the supply conduits are adapted to deliver a supply of hydraulic pressure to hydraulic motor means.

These and other objects and advantages and the details of construction of the invention will become apparent after reading the accompanying description of the illustrated embodiments of the invention with reference to the attached drawings wherein like reference characters have been used to refer to like parts throughout the several figures and wherein:

BRIEF DESCRIPTION OF THE FIGURES OF DRAWINGS

DESCRIPTION OF THE ILLUSTRATIVE EMBODIMENTS

Figure 1:
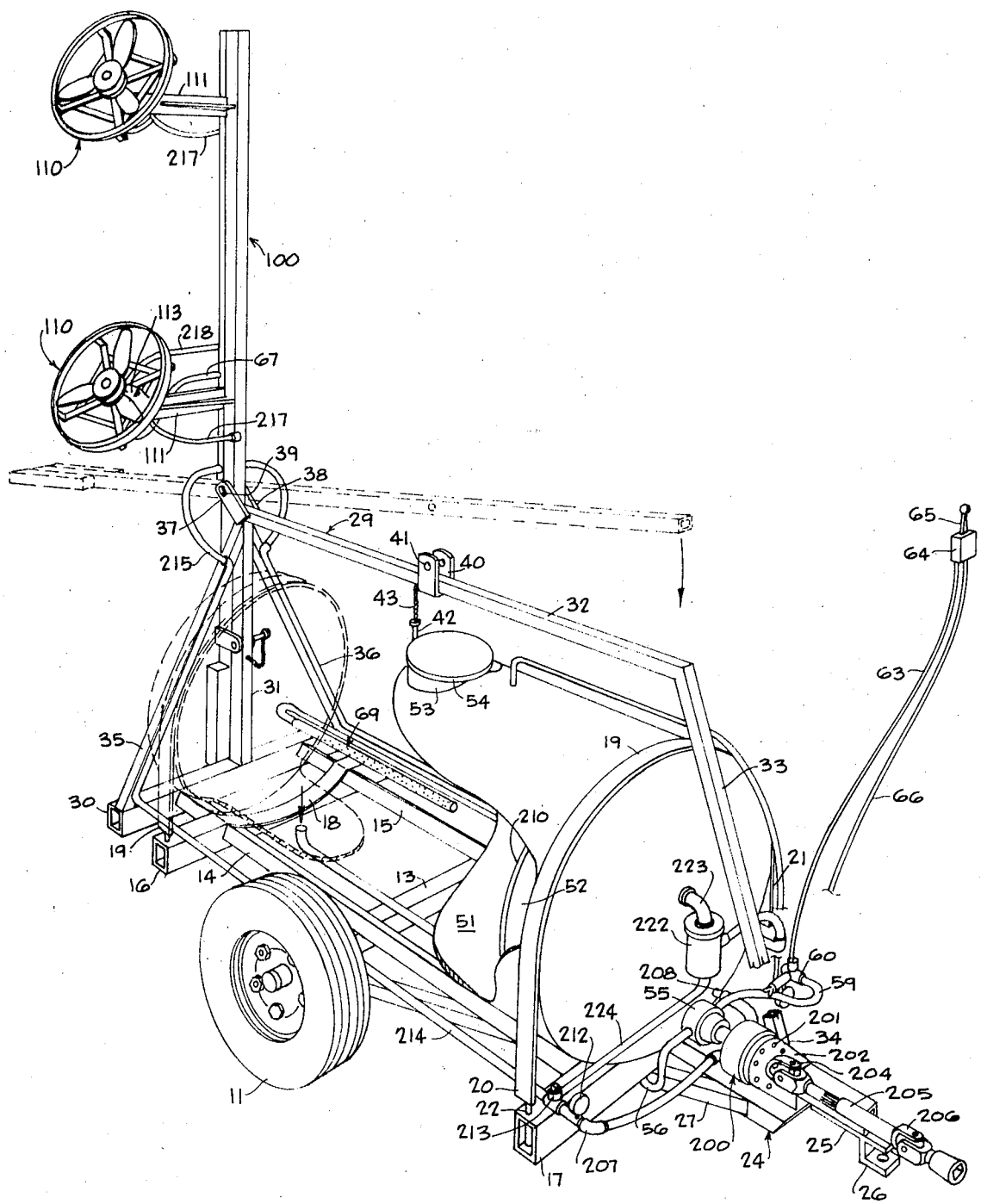
FIG. 1 is a right front perspective view of the spraying system supported on a trailer type support vehicle, with certain parts broken away and shown in section and certain parts being omitted for purposes of clarity.

CONTENTS
A - General Description
B - Trailer Support Means
C - Chemical Supply Means
D - Boom Support Means
E - Spraying Head
F - Hydraulic Drive Means
G - First Modification
H - Second Modification
I - Operation

GENERAL DESCRIPTION

Referring now particular to FIGS. 1 –4 of the drawings, one illustrative embodiment of the invention will be described with reference to a spray system supporting means 10, including a trailer supporting vehicle; a chemical supply means including a supply tank 50 and a supply pump means 55; and a spraying means consisting of a spray head support means 100, a spray head 110 and a spray head drive means 200.

The vehicle supporting means 10 is utilized to provide a support for a spraying system including the chemical supply tank 50. The trailer 10 is adapted to be drawn over an area in which the fluid is to be sprayed by conventional tractor means. The spraying system includes a series of spraying heads 110 which are mounted on a spray head supporting boom 100. The spray head support boom 100 is pivotally attached to the vehicle support means 10 for pivotal movement from an operative substantially vertical position to an inoperative substantially horizontal position. Each of the spraying heads includes a fluid dispensing means, an impeller means and an annular diffusion member, with a fluid drive means for effecting rotation of said impeller means and diffusion member. Power for supplying pressure to the fluid drive means and for delivering fluid chemicals under pressure is effected by means of a conventional power take-off means from a tractor which is adapted to two the trailer support vehicle 10. The details of each of the above mechanisms will be described herein below.

TRAILER SUPPORT MEANS

As shown in FIG. 1, the trailer support means includes a trailer 10 having a pair of wheel support means 11, 12 rotatably mounted by conventional means (not shown) on opposite ends of a transverse axial housing 13. The trailer support framework includes a pair of fore and aft runners 14, 15 which are supported in laterally spaced parallel relationship on the axial housing 13. A pair of tank supporting cross members 16, 17 includes a convex shaped recess portion 18 detailed for receiving a supply tank to be supported thereon. As shown in FIG. 1, a supply tank is adapted to rest in the convex recess portions 18 on the two cross support members 16, 17 and between the fore and aft runners 14, 15. The supply tank is maintained in position on the cross supporting members by a pair of tank retaining bands 19. The retaining bands are detailed in design to be placed around the supply tank with the bands 19 having opposite threaded ends 20, 21 which are inserted through openings in an extended end of each of the cross connecting frame members 16, 17. The opposite threaded ends 20, 21 of the bands 19 are detailed for receiving complimentary threaded connecting elements 23 which when threaded thereon are detailed for tightening the bands around the supply tank to hold the tank in position on the trailer 10.

The trailer support vehicle 10 is adapted to be connected to a conventional tractor power means (not shown) by means of a draft means 24. The draft means 24 includes fore and aft tongue member 25 which extends forwardly from the forward tank support member 17. The forward end of the tongue 25 terminates in a connectable hitch means 26 which is detailed for receiving a conventional connecting pin for connecting the trailer 10 to a conventional towing vehicle. The draft means 24 includes a pair of rearwardly diverging brace members 27, 28 which extend from adjacent the tongue 25 to a opposite edge portion of the axial housing 13. The trailer support vehicle 10 including the fore and aft runners 14, 15 cross members 16, 17 and draft members 24, 25 are constructed of substantially rectangularly shaped tubular metal stock members which are welded together at their connecting points by conventional welding means (not shown).

Figures 3, 4:
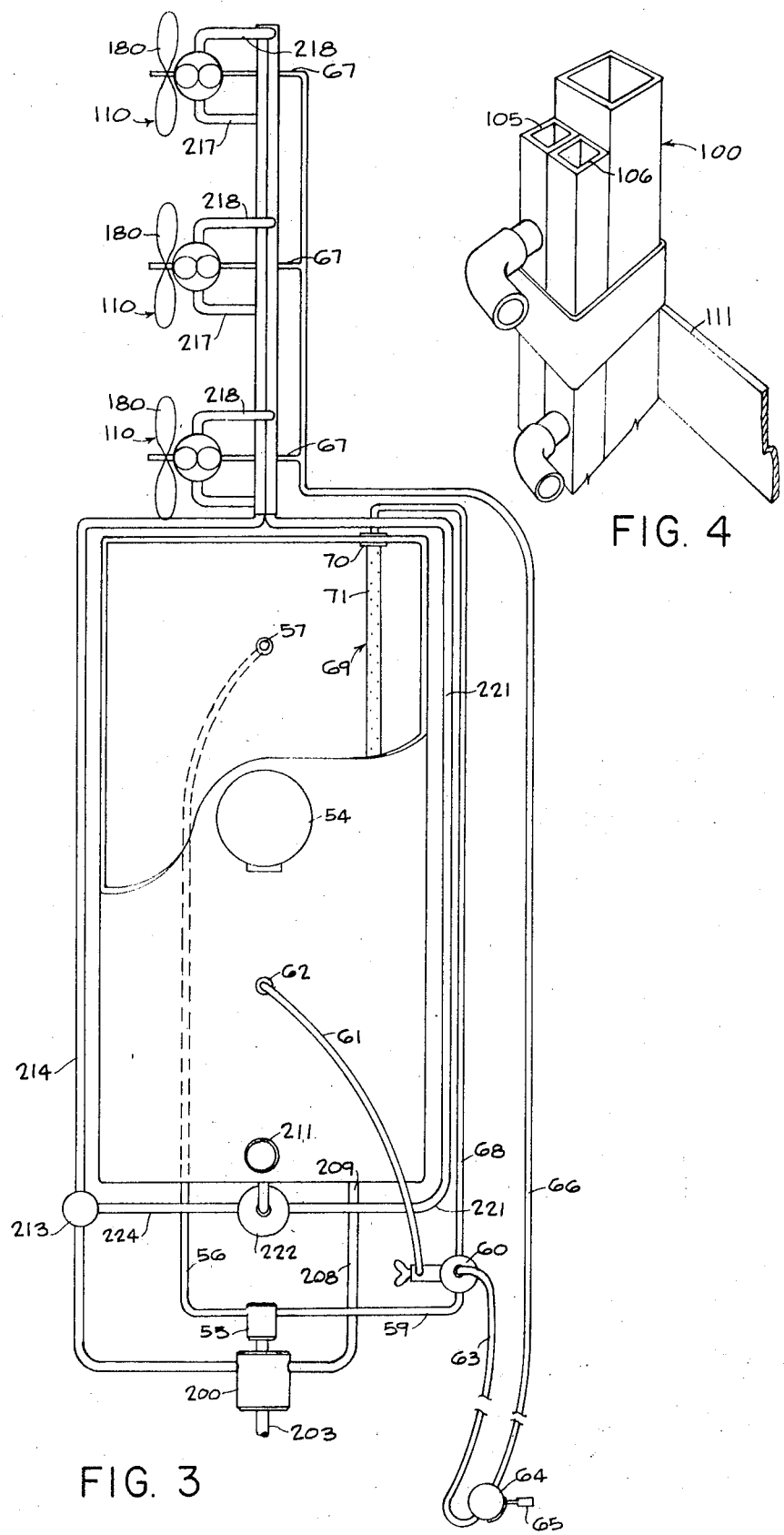
FIG. 3 is a schematic diagram of the fluid flow lines of the chemical supply system and the hydraulic supply system.
FIG. 4 is an enlarged fragmentary perspective view of the spray head boom support structure.

As shown in FIG. 4, the trailer support vehicle 10 includes a spray boom support means 29. The spray boom support means 29 is supported on a cross connecting member 30 which is connected to a rearwardly extended end of the fore and aft trailer runner members 14, 15. A vertically extending member 31 is connected to the cross support member 30 at a position substantially centrally spaced between the opposite ends of the cross connecting member 30. The vertically extending member 31 extends upwardly and terminates into a first end of a forwarding extending horizontal member 32. The horizontal extending member 32 is fixed in substantially parallel relationship to the trailer fore and aft runner members 14, 15 and is located at a position spaced above the supply tank. The forward end of the forwardly extending horizontal member 32 terminates in a downwardly angle portion 33 which has its forward extending end 34 connected to the draft tongue member 25.

Referring now again to FIG. 4, the boom support means includes two brace members 35, 36 which are connected to the opposite entended ends of the cross member 30 and extend upwardly in converging relationship and terminate at a position adjacent the top of the vertical extended member 31. The two upwardly converging brace members 35, 36 are connected by conventional means such as welding to the vertical extended member 31. Fixed to the boom support means at a position adjacent the top of the vertically extended member 31 are a pair of bracket members 37, 38 which are detailed for receiving a boom pivot support means. Each of the brackets 37, 38 includes an aligned opening 39 for receiving a pivot pin. Fixed to the forwardly extending horizontal member 32 at a forwardly spaced location from the pair of boom support brackets is a pair of brackets 40. The upwardly extended end of the brackets 40 includes aligned openings 41 for receiving locking pin 42. The locking pin 42 is attached to the forwardly extending member 32 by means of a flexible chain element 43. The locking pin 42 and brackets 40 with openings 41 are detailed for maintaining and locking a spraying head support boom in an inoperative position, as will be described in more detail herein below.

As shown in FIG. 4, the vertically extended member 31 of the boom support means includes an opening 44. The opening 44 is located on the vertically support member 31 substantially midway thereof and is detailed for receiving a locking pin 45 for locking the spraying boom in an operative position as will be described herein below. The locking pin 45 is attached to the vertical support member 31 by a flexible chain means 46.

The function of the vehicular support means is to provide a supported vehicle whereby the spraying system maybe towed over an area in which the fluid chemicals are to be sprayed. Further, the supported vehicle is designed to provide a boom support means for supporting a series of spraying heads whereby the boom can be moved from an operative to an inoperative position.

CHEMICAL SUPPLY MEANS

As shown in FIGS. 1 and 3, the chemical supply means includes an elongated cylindrical tank means 50 having opposite closed ends. The supply tank is provided with an internal wall divider member 58 located at a position spaced slightly rearward of the forward wall, as shown in FIG. 1. The purpose of the internal wall member 58 is to separate the cylindrical tank into a chemical supply portion 51 and a hydraulic fluid supply portion 52. The chemical supply portion 52 is provided with a chemical input port 53 having a readily removable cover means 54 provided with conventional securing means (not shown) for securing the cover to the chemical input port 53. Referring now to FIGS. 1 and 3, the chemical supply means includes a chemical supply pump 55 which is supported on a rearwardly extended drive shaft of a power take off means as will be described in more detail herein below. The chemical supply pump 55 includes an input line 56 which is in fluid flow communication with the internal area of the chemical supply tank portion 51, as shown at 57. An output line 59 extends from the chemical supply pump 55 and is connected in flow communication with a conventional pressure regulator means 60. A chemical return line 61 extends from the pressure regulator means 60 upwardly to a opening 62 for connecting the chemical return line 61 to the chemical supply portion of the tank 51. A supply line 63 extends from the pressure regulator means 60 upward to a remote control valve 64 which includes a manual control handle 65 detailed for controlling the rate of flow of chemicals therethrough to the spraying heads. A supply line 66 extends from the control valve means 64 rearwardly around the support framework of the trailer vehicle and upwardly along the boom supported means to a series of supply branches 67 which supply the fluid chemicals to the series of spraying heads.

Referring now particularly to FIG. 3, the chemical supply means includes a high pressure line 68 which extends from the pressure regulator means 60 rearwardly along the vehicle support framework. The high pressure line 68 terminates in flow communication with chemical agitator means 69. The chemical agitator means 69 includes an elongated tubular member which is supported within the chemical supply portion 51 of the supply tank 50. A conventional sealing connection 70 is provided for supporting the chemical agitator tube means 69 within the tank means 51. As shown in FIG. 3, the elongated tubular agitator members 69 includes a series of axially and circumferentially spaced apertures 71. The apertures 71 includes radial passageways which extend into the inside of the tubular agitator members 69. It is apparent that as fluid chemicals under pressure are forced outwardly through the series of apertures 71 that any chemicals contained in the supply tank around the agitator tube will be agitated to maintain the chemicals contained therein in a thoroughly agitated and mixed condition.

It is to be understood that the chemical supply lines above described are of conventional tubular means and the connecting members are of conventional construction which will allow fluid chemicals to flow therethrough to accomplish the above described spraying operation. The chemical supply pump 55 described herein above and illustrated in FIGS. 1 and 3 is of conventional construction which is capable of developing a supply of fluid chemical under pressure.

BOOM SUPPORT MEANS

Figure 2:
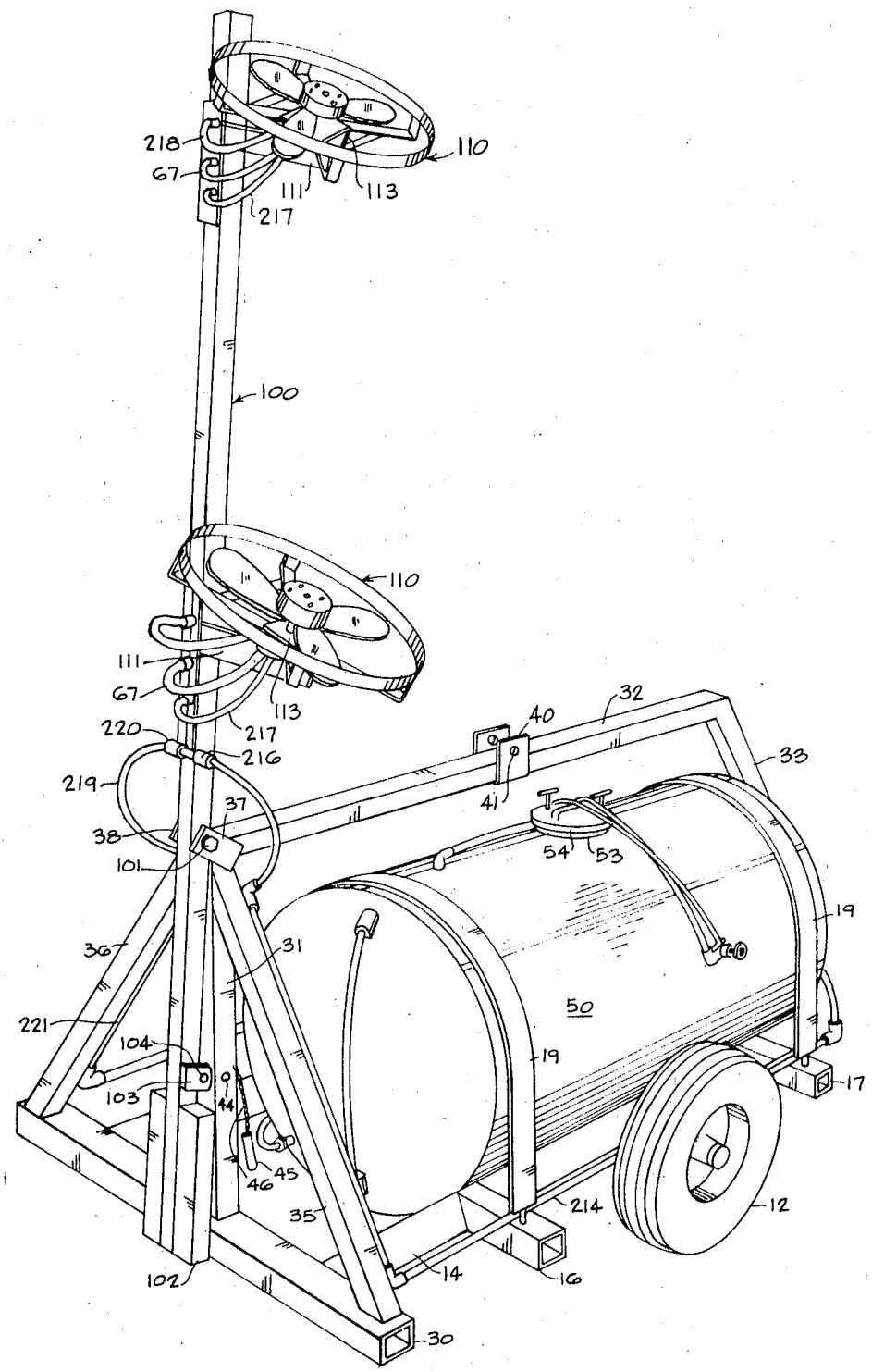
FIG. 2 is a right rear perspective view of the spraying system and support vehicle as shown in FIG. 1.

The function of the boom support means is to provide a supporting mechanism for a series of spraying heads whereby the spraying heads can be moved from a retracted inoperative position for transport to an operative position elevated above the support vehicle for a spraying operation. As shown in FIG. 1, 2 and 4 the boom support means includes an elongated element 100 which is pivotally connected to the boom support brackets 37, 38 by a pivot pin 101. One end of the boom 100 is provided with a counter weight means 102 which is detailed in weight to help counter balance the weight of the extended end of the boom with spraying heads mounted thereon whereby the boom can be easily moved between its operative and inoperative positions. An opening 104 is provided in the boom 100 at a position spaced from the boom support pin 101. The opening 104 is detailed for receiving the locking pin 42 for maintaining the boom in a locked inoperative position during transport. A pair of locking brackets 103 (only one of which is shown) is provided on the elongated boom member on an opposite side of the pivot pin 101 from the opening 104. The locking brackets 103 are provided with aligned openings 105 for receiving the locking pin 45 to lock the boom in an elevated upright operative position during a spraying operation.

Figure 12:
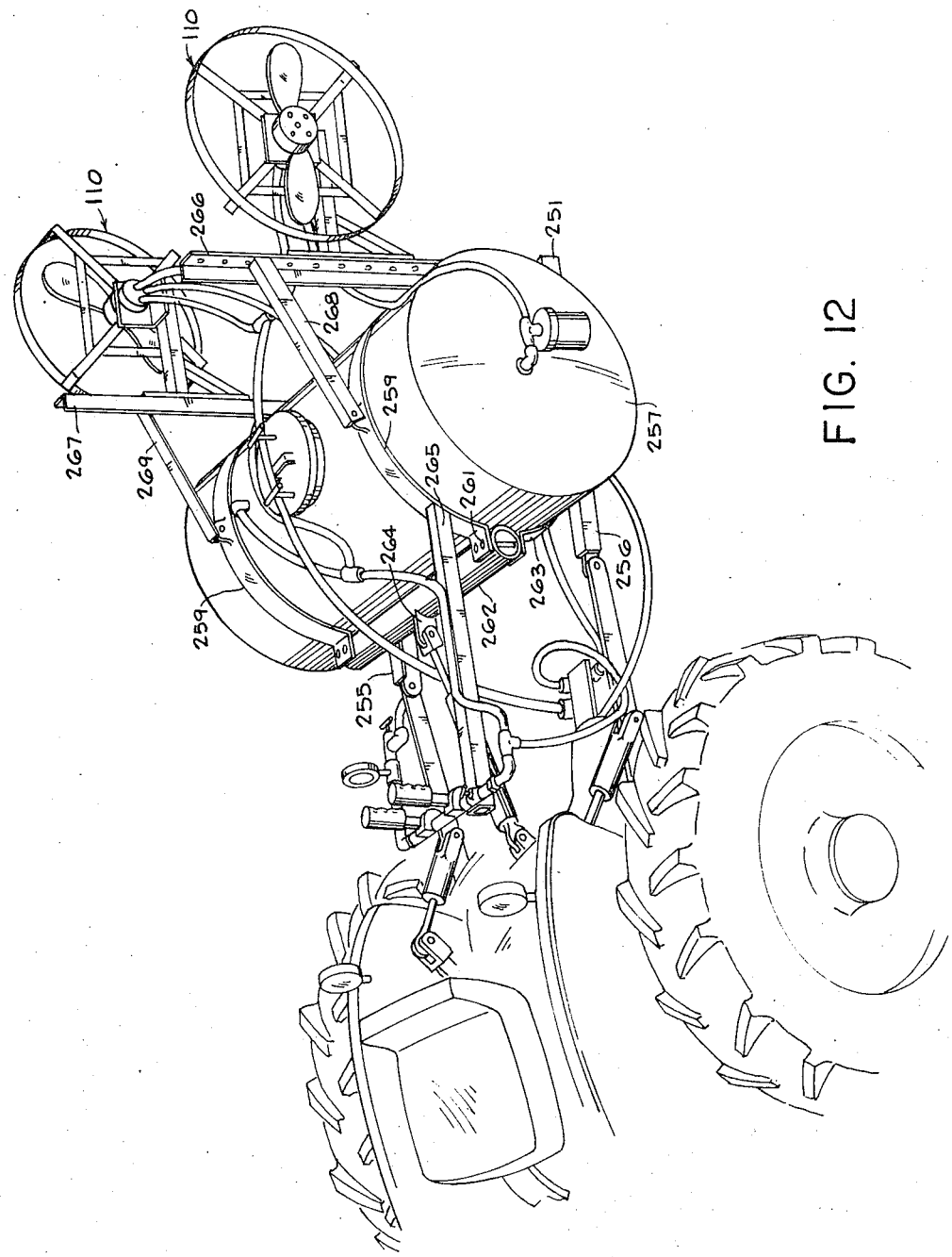
FIG. 12 is a right front perspective view of the spraying system and support framework shown in FIG. 10.

As shown in FIG. 4, the boom 100 is constructed of a series of substantially rectangular shaped tubular members. Two of the tubular members 106 are detailed to serve as supply conduits for supplying a source of hydraulic fluid under pressure to a rotatable motor drive means of a spraying head which will be described herein below. The main support boom member and the two boom supply conduits are connected together by conventional means to form a boom supporting structure. The supply conduits 106 are detailed in size relative to the size of the elongated boom 100 member to provide the necessary strength to support the spraying heads in their proper positions. The use of the supply conduits 106 as a structural part of the boom supporting means 100 will eliminate the necessity for having a series of hose supply means attached thereto. The use of the supply conduits 106 for transferring the hydraulic fluid pressure reduces the risk of damage to conventional hydraulic hose material which would normally be attached thereto in a conventional hydraulic delivery operation. A series of spraying heads 110, the details of which will be described herein below, is supported from the boom member 100 by means of an elongated plate member 111. The plate members 111 are attached to the boom means 100 in spaced relationship by means of conventional connecting bolts 112. Supported on the extended end of the plate members 111 is an angle supporting bracket 113. Angle bracket 113 is adjustable about an axis substantially transverse to the axis of the elongated boom member by means of a pivot bolt 114 which extends through an opening in the angle bracket 113 and plate member 111. An arcuate shaped opening 116 (as shown in FIG. 12) is provided for receiving an adjustable connection bolt 115 for locking the spraying head and support bracket 113 in a selected adjusted position. Angle bracket 113 is provided with a mounting surface 117 which is detailed for supporting a spraying head consisting of a hydraulic motor 120, a dispensing nozzle 150, a diffusion member 160 and a rotary impeller means 180, the details of which will be described herein below.

SPRAYING HEAD

The function of the spraying head is to receive a supply of fluid chemicals under pressure, dispense the chemicals into a diffusion chamber, develop a blast of air pressure around said diffusionchamber for forcing the droplets of chemicals into a diffused array of fog-like air containing chemicals in a radially and axially extended direction therefrom. Referring now particularly to FIGS. 5-9, the spraying head 110 includes safety guard means 190 which is detailed for surrounding the rotary impeller means to prevent damage thereto. The safety guard means 190 includes a series of radially projecting brace members 191. One end of the brace members is fixed by conventional means such as welding to the mounting surface 117 of the angle support bracket 113. Each of the radially extending brace members 191 includes a formed end portion 192 extending at substantially right angles away from the brace members 191. Supported on the formed end portions 192 is an annular rim 193. The rim 193 is substantially circular in configuration and is supported coaxially relative to a rotary impeller means as will be described herein below. As shown in FIG. 1, a series of bracing elements 194 extend between the radially extending members 191 at a distance radially spaced from the supporting surface 117 of the angular support bracket 113.

Figure 5:
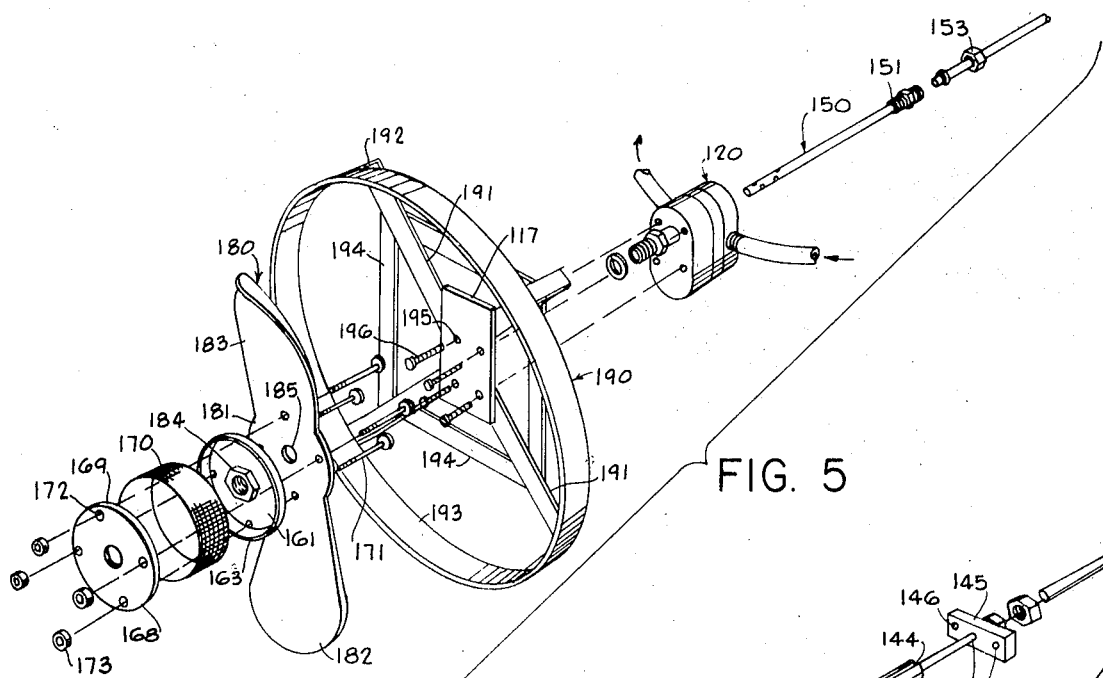
FIG. 5 is an exploded perspective view of the spraying head.

As shown in FIG. 5, the mounting surface 117 of the angular supporting bracket 113 includes a series of openings 195 which are detailed to receive a series of threaded connector elements 196 for attaching a hydraulic motor means 120 to the underside of the mounting surface 117.

Figure 6:
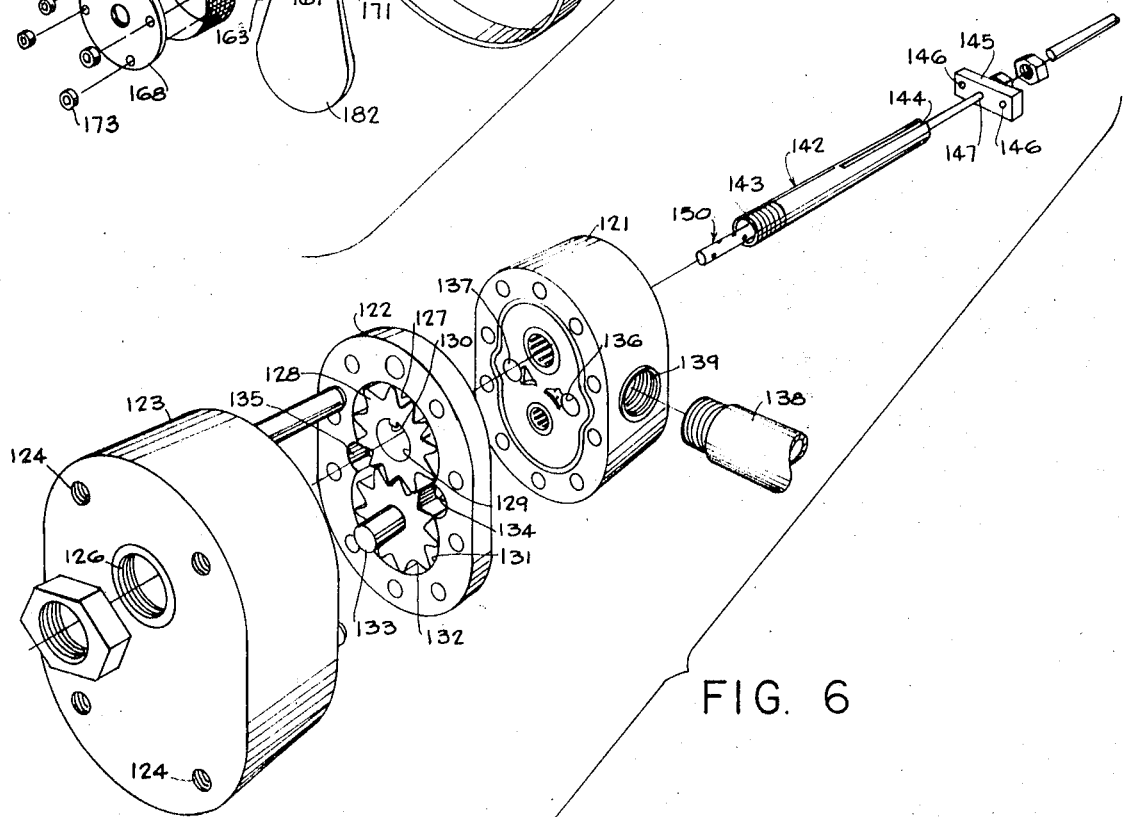
FIG. 6 is an exploded perspective view of the hydraulic motor drive means shown in FIG. 5, drawn on an enlarged scale.

Referring now particularly to FIG. 6, the hydraulic motor means 120 will be described with reference to a motor housing having a fluid input, output support means 121, a driving portion 122, and a cover portion 123. The cover portion 123 includes a series of openings for receiving the threaded connector elements 196 for attachment of the hydraulic motor to the angle mounting bracket 113 as indicated herein above. Extending through the cover portion 123 is an opening 126 detailed for receiving a rotary impeller supporting sleeve 142, as will be described herein below. The driving portion 122 of the hydraulic motor includes a first cylindrical chamber portion 127 detailed for rotatably supporting a first driving gear 128. Extending through the driving gear 128 is an opening 129 coaxially arranged relative to the rotational axis of the driving gear 128. As shown in FIG. 6, the driving gear 128 includes key means 130 for supporting the driving gear 128 in nonrotational driving relationship relative to the rotary impeller sleeve member 142. Disposed immediately below the first cylindrical chamber 127 as shown in FIG. 6 is a second cylindrical chamber 131. The second cylindrical chamber 131 is detailed for rotatably supporting a second drive gear 132 the second drive gear 132 includes a stud-shaft 133 which has extending ends adapted to be rotatably supported in the cover portion 123 and input, output portion 121. The driving portion of the hydraulic motor means includes an input port 134 located immediately adjacent the first and second cylindrical chamber means and at a point for directing a supply of hydraulic fluid under pressure to the emeshing teeth of the first and second gear members and at a direction substantially transverse to the rotational axis of the two gear members. Located in the driving housing 122 in direct transverse alignment with the point opposite the emeshing teeth of the first and second gear members is an output port 135 which is detailed for allowing the fluid under pressure to be exhausted from the gear drive means.

Referring now to FIG. 6, the hydraulic motor fluid input, output portion 121 is provided with a pair of parallel arranged openings 136, 137. Opening 136 is detailed for receiving a stud-shaft 133 of the second gear member 132. The opening 137 is detailed for receiving the rotatably supported sleeve 142 which extends through the input, output portion 121, through the driving portion 122, through the cover portion 123 and extends therefrom to support the rotatable impeller 180 as will be described hereinbelow.

The sleeve 142 includes a threaded end portion 143 and a notched key-slot means 144 extending longitudinally along the outer surface of the sleeve for receiving the key 130 of the driving gear 128. The sleeve 142 is maintained within the hydraulic driving motor 120 by means of a mounting block 145 which is attached to the rear side of the fluid motor input, output portion. The mounting block 145 includes a pair of openings 146 detailed for receiving conventional threaded connecting means for attaching the mounting block to the motor input, output portion 121. Sleeve 142 is connected to the mounting block for rotational non-axial movement by conventional means (not shown). A central opening 147 is formed in the mounting block 145 to be coaxial with the passage of the sleeve 142 to allow the dispensing nozzle 150 to be inserted therethrough.

Figure 7:
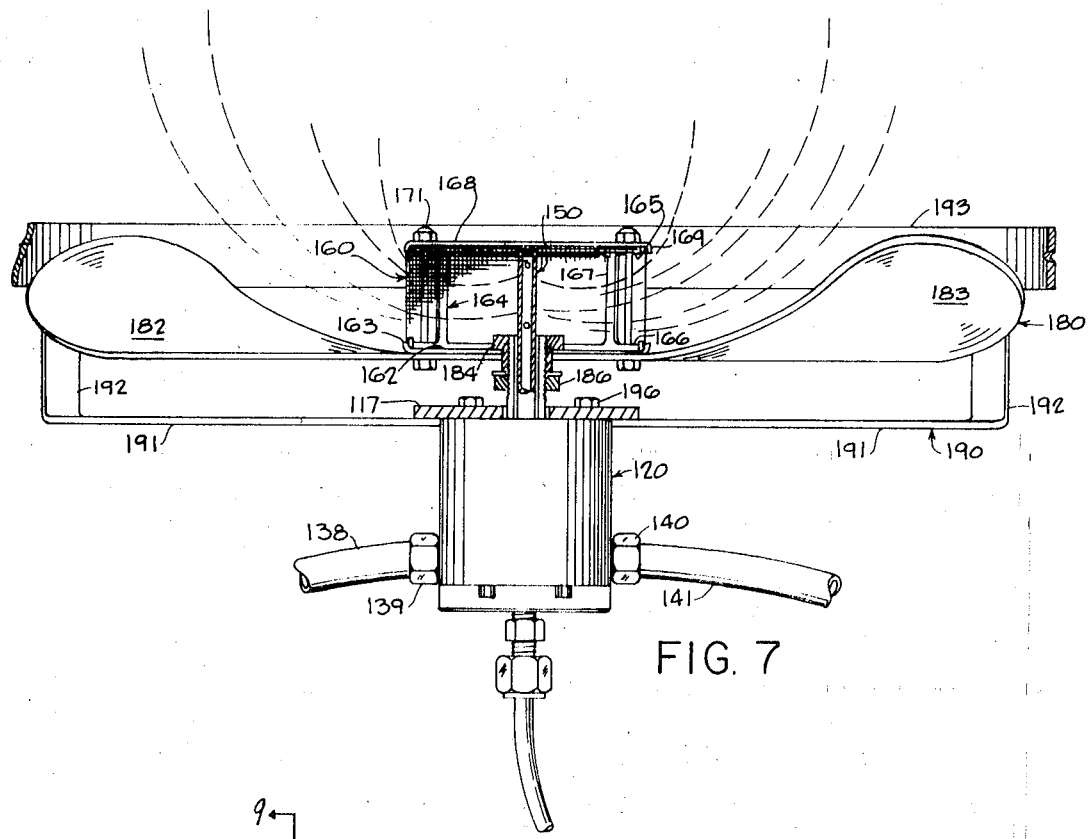
FIG. 7 is a vertical sectional view taken substantially midway through one of the spraying heads.
Figures 8, 9:
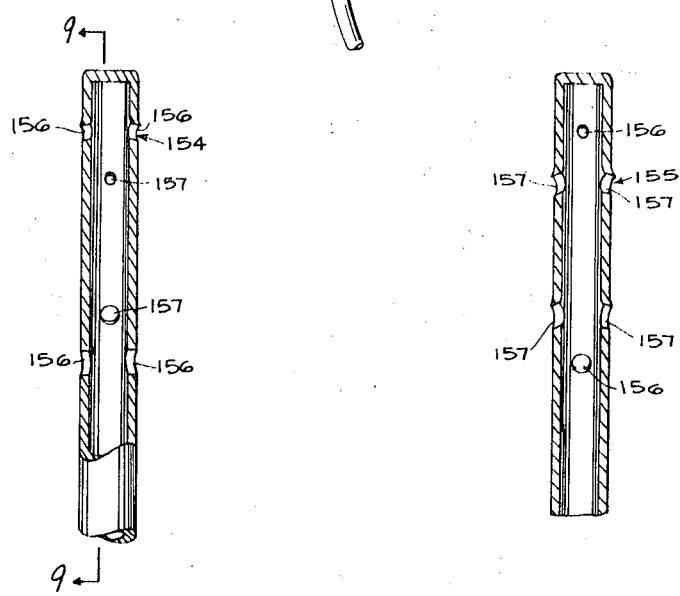
FIG. 8 is an enlarged elevational view of the chemical dispensing nozzle shown in FIG. 7, with portions thereof broken away an shown in section for purposes of clarity.
FIG. 9 is a vertical sectional view taken substantially along lines 9—9 of FIG. 8.

As shown in FIG. 7-9, the dispensing nozzle 150 is supported in the mounting block 145 by a conventional threaded connecting bushing 151 which includes complimentary threads for receiving a conventional connector element 152 for attaching a fluid chemical supply line thereto. The dispensing nozzle extends upwardly through the sleeve member 142 as shown in FIG. 3 and projects upwardly beyond the extended end of sleeve 142. Nozzle 150 includes a closed end and a series of dispensing orifices. The dispensing orifices are detailed to include a first set having two pairs of transversely aligned orifices 154, 155 and a second set having two pairs of transversely aligned orifices 156, 157. As shown in FIGS. 8 and 9 of the drawing, the first set of aligned pairs of orifices 154, 155 are axially spaced relative to the second set of aligned pairs of orifices 156, 157. Each of the sets of orifices 154, 155 and 156, 157 are detailed to include flow passageways. The passageways of the orifices which are spaced closest to the closed end of the nozzle are formed of one diameter and the orifices which are spaced further from the closed end of the nozzle are formed of a second diameter. The orifices having the second diameter are detailed in dimension to be larger than the orifices having a first diameter. The orifices of the first set 154, 155 are angularly displaced substantially 190° relative to the second set of orifices 156, 157. Referring now particularly to FIGS. 8 and 9 it is clearly shown that the axial passage of each of the above identified orifices are formed in the surface of the nozzle such that the axis of the orifices is angularly disposed relative to the longitudinal axis of the orifices and wherein the angularly disposed axis of the orifices are directed away from the closed end of said nozzle and towards the rotary impeller means 180.

As shown in FIGS. 5 and 7, each of the spraying heads includes a rotary impeller means 180. The rotary impeller means 180 includes a central flat portion 181 detailed for supporting the dispensing and diffusion chamber 160, as will be described hereinbelow. Extending radially outward from the impeller central portion 180 are a pair of impeller blades 182, 183. The impeller blades 182, 183 are detailed and designed such that when rotated they will create or develop an orbital stream of radially and axially flowing air pressure. The impeller 180 is provided with a conventional threaded bushing 184 fixed thereto by conventional means (not shown) and includes an opening 185 having threads complimentary to the threads of the threaded end of sleeve 142. The bushing 184 is threaded on the sleeve threaded portion 143 and is locked thereon by means of a locking nut 186. Thus, it can be seen that rotation of the sleeve 142 will effect a corresponding rotation of the impeller means 180.

The dispensing and diffusing chamber 160 includes a bottom plate 161 having a substantially circular flat surface 162 with an up-turned flange portion 163. Spacer means 164 is supported on the bottom plate 161 and includes two annularly rim portions 165, 166 held in axially spaced relationship by means of integrally formed elements 167. A cover plate 168 is provided to overlie the annularly rim 168 of the spacer means and includes a down turned flange portion 169, as shown in FIG. 7. Supported around the spacer element 164 is a cylindrical screen element 170. Screen 170 includes a network of finely spaced openings extended therethrough for allowing the droplets of fluid chemicals dispensed to be directed outwardly by centrifugal force therethrough into the orbital streams of air pressure.

The above described dispensing and diffusing chamber is maintained in place on the central flat portion 181 of the rotary impeller means 180 by means of a series of connecting bolts 171 which is detailed to extend through a series of openings 172 in the cover 168 and bottom plate 161, and which extends through complimentary openings in the circular flat portion 181 of the rotary impeller 180. The connecting bolts 171 are maintained in place thereon by a series of complimentary connecting nuts. As shown in FIG. 7, the assembled diffusion and dispensing chamber is detailed such that the up turned flange portion 163 and the down turned flange 169 surrounds opposite ends of the cylindrical screen element 170. This will insure that the screen element 170 is maintained in a proper position on the rotary impeller head. The screen member 170 is preferably a perforated web or wire screen which separates the liquid into finely divided form.

HYDRAULIC DRIVE MEANS

As shown in FIG. 1, the hydraulic drive means includes a hydraulic pump 200 supported by a series of conventional connector elements 201 to a support bracket 202. Support bracket 202 is fixed to the draft means 25 by conventional means, such as welding, and is detailed to project outwardly therefrom whereby the hydraulic pump will be off-set from the longitudinal axis of the draft means. The hydraulic pump 200 is of conventional construction and is driven by means of a shaft 203 which extends forwardly therefrom, as shown in FIG. 1. Shaft 203 is connected by conventional universal connection 204 to a telescoping drive shaft 205. The telescoping drive shaft 205 includes a second universal connection 206 having an adapter element which will permit the connection of the drive shaft and universal point to a conventional power take-off of a tractor means.

As shown in FIGS. 1 and 3, the hydraulic pump 200 includes a high pressure out-put line 207, and a low pressure input line 208. The low pressure input line 208 communicates in flow communication with the hydraulic reservoir 52 provided as an integral portion of the supply tank 50a. The hydraulic reservoir 52 includes an input port means 211 which will allow the readily replacement of hydraulic fluid thereto as required. A pressure gauge and pressure regulator is of conventional construction and need not be described in detail herein. Extending rearwardly from the pressure regulator 213 is a hydraulic supply line 214 which extends along the trailer support frame and terminates at a position slightly below the boom connecting bracket 37, 38 as shown in FIGS. 1 and 2. A flexible hose 215 is connected to the terminating end of the supply line 214 and has an opposite end which is in flow communication with one of the hydraulic supply conduits 105, 106 provided on the boom structure 100 as described hereinabove. The hydraulic fluid is transferred from the boom supply conduits 105 by means of flexible branch supply lines 217 which are adapted to be connected thereto by conventional means. An opposite end of the branch supply line 217 is connected to the hydraulic motor means as shown in FIG. 5.

Each of the spraying heads 110 is provided with a flexible hydraulic fluid return hose 218 which has an opposite end connected to a second one of the boom supply conduits 106. The hydraulic fluid from the boom supply conduit 106 is returned by a flexible hose 119 connected in flow communication with a hydraulic fluid return line 221 as shown in FIG. 3. The return line 221 terminates into a hydraulic fluid filter means 222 supported on the front of the tank means as shown in FIG. 1. The filter means 222 is of conventional construction for filtering undesirable residue from the hydraulic fluid to insure a continued reliable operation of the hydraulic pump and motor means. The hydraulic fluid is transferred from the filter means 222 by a flow connection 223 with the hydraulic reservoir. A branch hydraulic fluid flow line 224 is connected between the pressure regulator 213 and the filter means. As stated hereinabove the hydraulic supply lines including flexible hose, supply and return conduits and connectable means therefor are of conventional construction which will allow the readily flow of hydraulic fluid therethrough. It is pointed out that the speed of the hydraulic driving system can be varied by varying the speed of the power take-off drive means delivered from a tractor to the hydraulic pump 200. By varying the speed of the hydraulic pump, the air pressure created by the rotary impeller means can be changed to adapt the spraying heads for various types of chemical spraying operations. A requirement for varying the speed of rotation of the rotary impeller means would be determined by the particular type of chemical being sprayed and by the type of foliage on which the spray application is to be applied.

FIRST MODIFICATION

In some types of chemical spraying operations, the use of a trailing vehicle described herein above is not desirable, since the mobility of the spraying rig to move around in particularly close corners or confined areas is limited. Further, some types of spraying operations require a much smaller spraying capacity system. A modified form of spraying system and support means to meet the above requirements is provided. The modified system includes means for attaching the spraying system to a conventional three point connecting means of a support vehicle.

Figure 10:
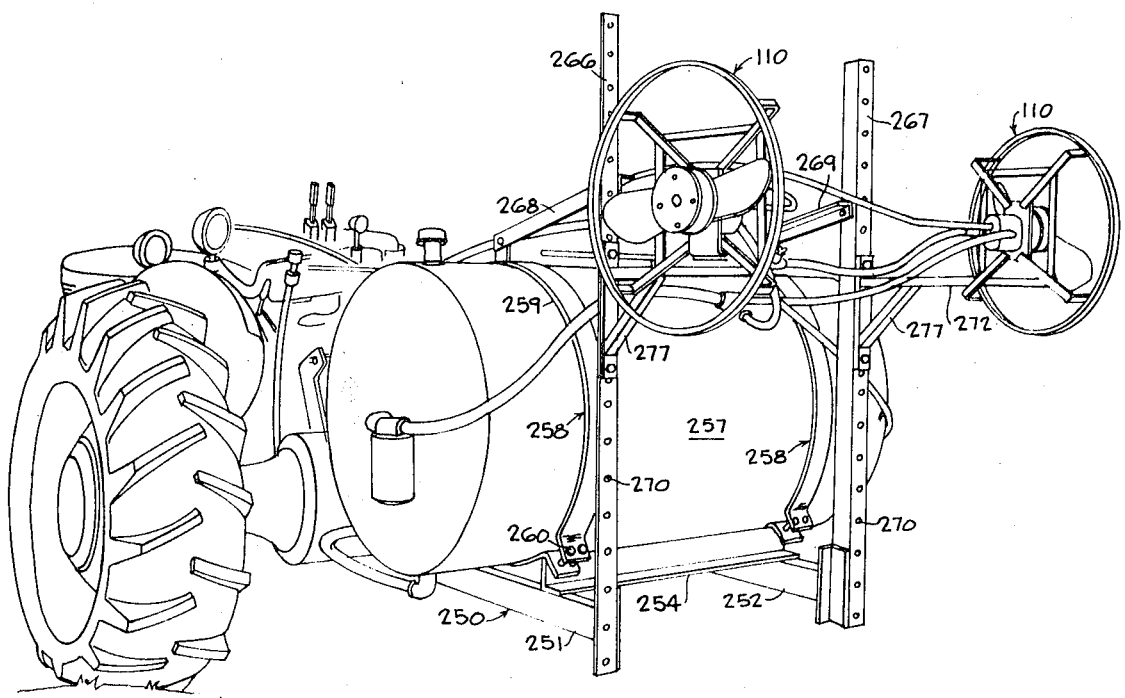
FIG. 10 is a left rear perspective view of the spraying system supported on a modified support framework.
Figure 11:
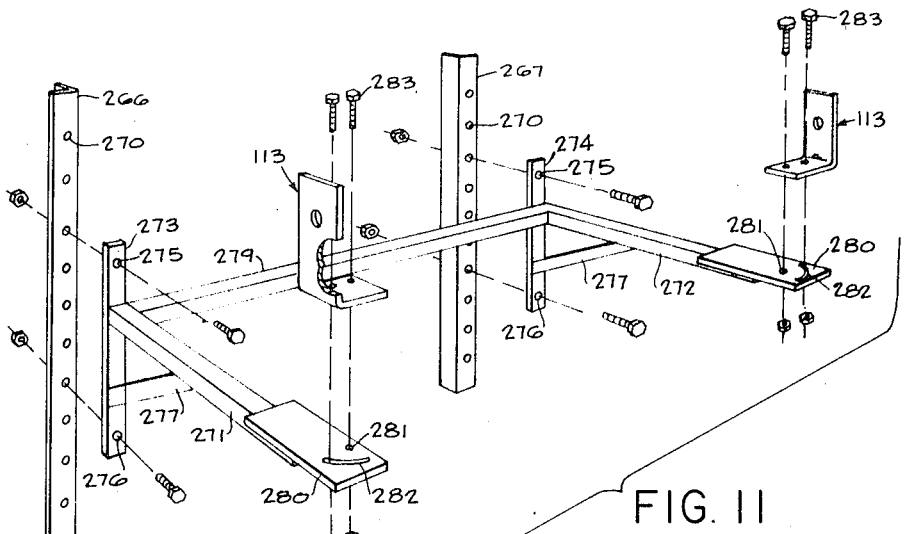
FIG. 11 is an exploded perspective view of the spray head support framework shown in FIG. 10 with certain parts being omitted and certain parts shown broken away and in section for purposes of clarity.

As shown in FIGS. 10–12, the modified support means for a spraying system includes a base frame 250 having a pair of fore and aft runners 251, 252. A pair of transverse tank support members 253, 254 is secured to the top of the fore and aft runners 251, 252 in space relationship and detailed to provide a proper base of support for a chemical supply tank 257. The forward end of each of the fore and aft support members 251, 252 includes a detailed end portion 255, 256 designed for receiving a connecting element, such as a conventional pin means for attaching the base support means to the two bottom hitch members of a conventional three point hitch. The supply tank 257 is maintained in place on the base support frame means by a pair of retaining bands 258. Each of the retaining bands 258 includes a first portion 259 having one end connected to the transverse support member 254 by means of conventional connecting bolts 250. Each of the retaining bands 259 extends upwardly over the supply tank and terminates at a point spaced vertically upward from the pair forwardly extending connector elements 255, 256. The forward terminating end of each of the retaining bands first portions 259 is connected by bolts 261 to a transverse connecting member 262. Each of the retaining bands 258 includes a second portion 263 extending from the transverse connecting member 262 down around the supply tank 257 and is connected on a opposite end to the second transverse frame member 253 by conventional means (not shown). The transverse connecting members 262 includes a for-wardly projecting bracket 264 located substantially intermediate the ends thereof. The bracket 264 is detailed in design to provide a detachable connecting element for attachment to the top link of a conventional three point hitch, whereby the modified spray support systems can be supported on a vehicle as above described.

The support band 258 as shown in FIG. 12 includes a forwardly projecting supporting arm 265 detailed to provide a support means for the remote controls which operate the hydraulic pump and chemical pressure means for the spraying system as will be described herein below.

Referring now particularly to FIG. 10 and 11, the modified spray supporting system includes a pair of vertically oriented support standards 266, 267 connected to a rearwardly extending end of the pair of fore and aft runners 251, 252 respectfully. A pair of brace members 268, 269 is connected at one end of each of the retaining bands 258 and extends rearwardly for connection to the standards 266, 267. Each of the standards 266, 267 is provided with a series of vertical space openings 270 for supporting a spray head support means in a plurality of vertically spaced positions.

As shown in FIG. 11, the spray head support means includes a pair of fore and aft support arms 271, 272 connected adjacent there forward end to vertically extending mounting brackets 273, 274, respectfully. Each of the mounting brackets 273, 274 include space opening 275, 276 for receiving suitable connecting bolts for attaching the mounting brackets in select positions on the verticle standards 266, 267. Brace means 277, 278 is connected in angularly disposed relationship between the support arms 271, 272 and mounting brackets 273, 374, respectfully for providing supporting strength to the rearly projected end of the supporting arms. The two supporting arms and mounting brackets are connected in laterally spaced relationship by means of a cross connecting bar 279. The bar 279 is detailed in length to provide a correct spacing between the arms 271, 272 for proper alignment with the vertically oriented standards 266, 267. The rearly projecting ends of each of the support arms 271, 272 is provided with a mounting plate 280 fixed thereto by conventional means, such as welding, to provide a substantially horizontal flat supporting surface for the spray head angle mounting bracket 113. Each of the plates 280 includes an opening 281 for receiving a pivot bolt therethrough for securing the spray head mounting bracket to the mounting plate 281. Also provided on the plate 280 is an arcuate shaped slot 283. The slot 282 is coaxially located relative to the pivot opening 281 whereby a second securing bolt can be inserted therethrough for holding the spray head mounting bracket in various angularly disposed adjusted positions.

From the above description of the modified support means of a spraying system, it is apparent that the support means will provide a rigid supporting system for a chemical supply tank and a series of spraying heads. Further it is apparent that the spraying heads are supported on the supporting means in such a manner that the spraying heads can be moved to a selected one of a series of vertically spaced positions. Further, each of the spray heads are supported for adjusted about a substantially vertical axis to dispose each of these spraying heads at a selected angularly disposed position.

Figure 13:
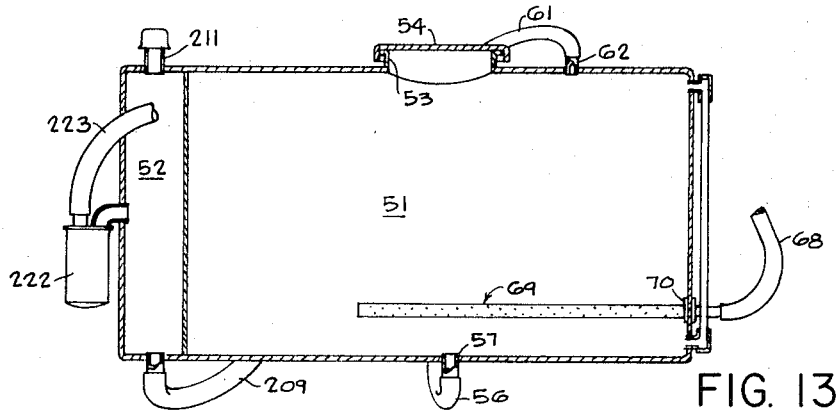
FIG. 13 is a vertical sectional view taken longitudinally through the chemical supply tank shown in FIGS. 10 and 12.
Figure 14:
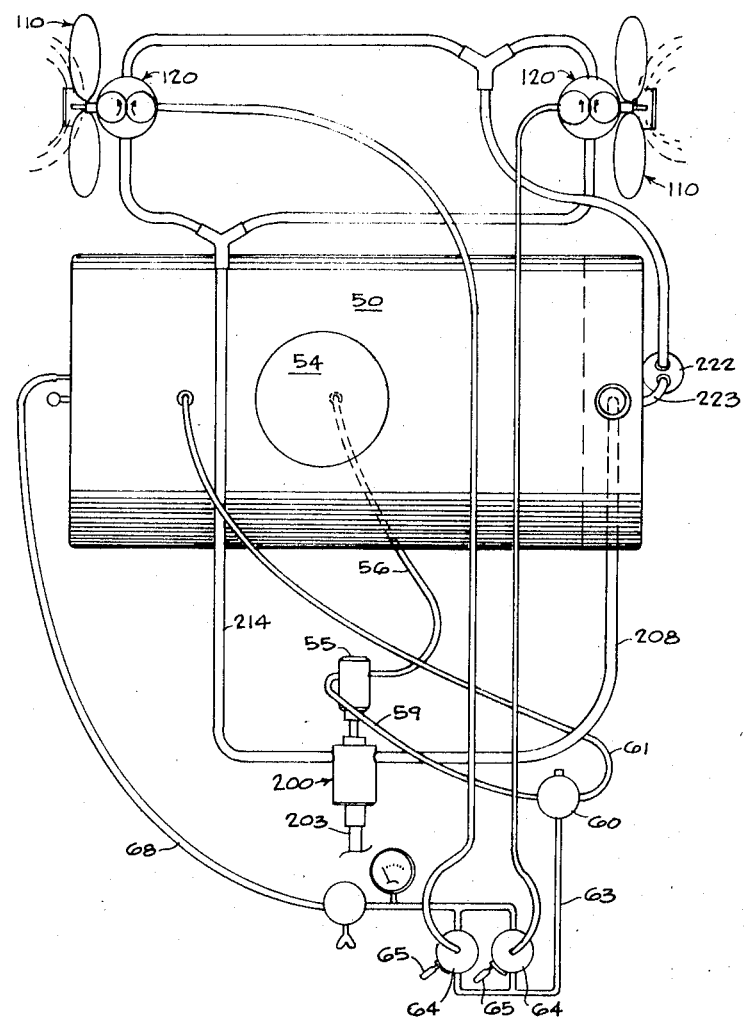
FIG. 14 is a schematic view of the flow diagram for the chemical supply means and the hydraulic supply means of the spraying system illustrated in FIGS. 10-13.

Referring now particularly to FIGS. 13 and 14, the spraying system for use on the modified support means includes a tank for supporting the hydraulic fluid and chemicals, a hydraulic driving system, and a chemical pressure dispensing means, all of which are similar to the corresponding components as described in regard to the spraying system illustrated in FIGS. 1–9. Therefore, the same reference characters have been applied to the corresponding parts illustrated in FIGS. 10–12 and reference is made to the above description of the various parts for the details of construction.

SECOND MODIFICATION

In various types chemical spraying operations it is desirable to spray the chemicals over a very wide area such as in applying pesticides to certain crops grown in the field. For this reason, it is necessary to support the spraying heads in a laterally spaced position over a relative wide area. The first two spray system supporting means above described do not lend themselves to this particular type of operation.

Figure 15:
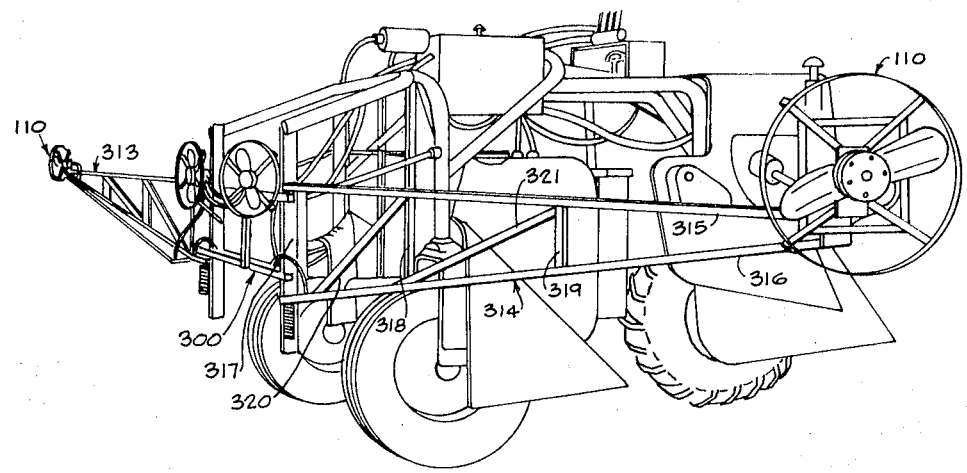
FIG. 15 is a left front perspective view of a modified form of a supporting means for supporting the spraying system, with certain parts being omitted for purposes of clarity.
Figure 16:
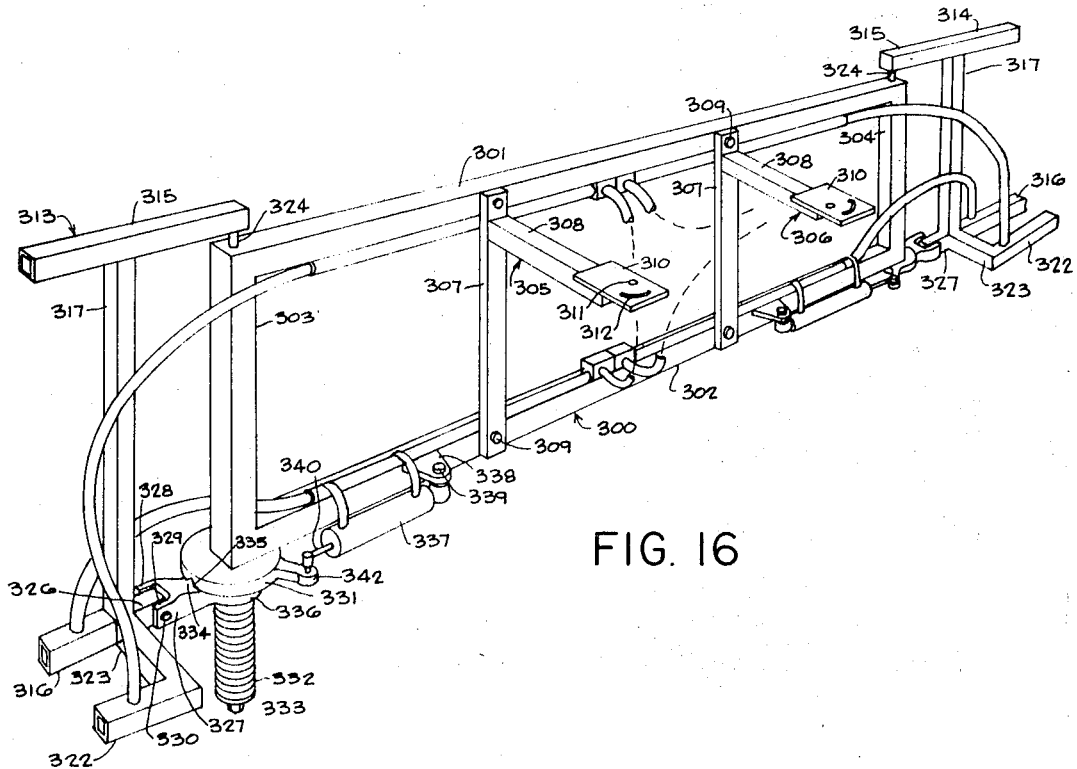
FIG. 16 is an enlarged fragmentary perspective view as seen from the left front of FIG. 15, with certain parts being broken away and certain parts being shown in section for purposes of clarity.
Figure 17:
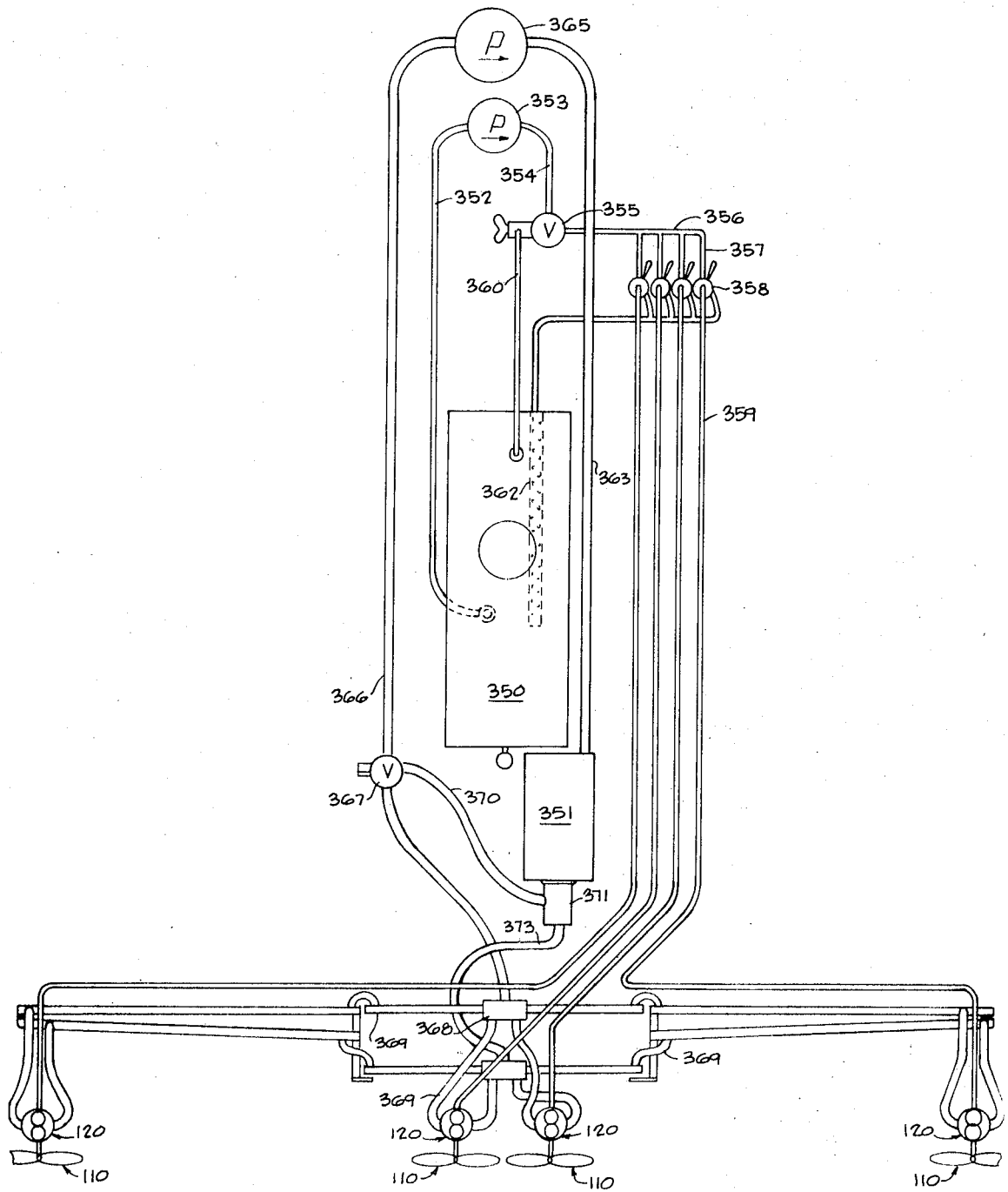
FIG. 17 is a schematic diagram of the fluid flow lines of the spraying system illustrated in the modified support framework of FIGS. 15 and 16.

Referring now particularly to FIGS. 15–17 still another spray system support means is provided for use in supporting a series of spraying heads 110 in laterally spaced relationship. FIG. 16 shows a transverse support mast 300 which is provided with conventional connectable means (not shown) for attaching the spraying mast to a vehicle for transporting the spraying system over the crops to be sprayed. The particular supporting vehicle illustrated in FIG. 15 is of a conventional type supporting vehicle which is known in the art as a My-Boy tractor. The supporting mast 300 is provided with a pair of vertically spaced horizontal range support members 301, 302. Fixed to opposite ends of the members 301, 302 or vertically extending elements 303, 304 connected thereto by conventional means, such as welding, to maintain the horizontal members 301, 302 in vertically spaced relationship. A pair of spray heads support means 305, 306 are shown in FIG. 16, each of which includes a vertically oriented member 307 and a projecting horizontal supporting member 308. Conventional connecting bolts 309 are provided for attaching the horizontal support element to the vertically spaced members 301, 302. The projected end of the horizontal support members 308 are provided with a spray head supporting plate 310. The plates 310 are provided with pivot openings 311 and arcuate slots 312 for adjustably supporting a spraying head thereon as described herein above.

Mounted on opposite ends of the support mast 300 is a pair of laterally projecting boom structure 313, 314. Each of the lateral supporting booms includes a truss like structure having an upper frame member 315. Connected to an extended end of the upper frame member 315 is an angle frame member 316 which extends downward toward the bottom of mast 300. The frame members 315, 316 are maintained in proper angular relationship relative to each other by a series of vertically connecting elements 317, 318, and 319. A pair of angle brace members 320, 321 are connected to the upper and lower frame members 315, 316 between the vertical extending elements 317—319, as shown in FIG. 15. The lateral extending booms 313, 314 includes a second angle frame member 322 detailed to be substantially do-planer with the first angle frame member 316. The second angle frame member 322 is connected to the lower frame member 316 adjacent the extended end thereof and extends inwardly in an angularly relationship. The inwardly spaced ends of the two frame members 316, 322 are maintained in space relationship by means of a fore and aft connection bar 322. Angle members 316, 322 provides a dual function of, adding rigidity and support to the laterally extending booms 313, 314 and also serve a hydraulic fluid flow conduits for transferring hydraulic fluid to a spraying head motor drive means mounted on an extended end thereof. It is pointed out that the above described truss support members which make-up the laterally extending booms are of conventional tubular metal stock members connected together by conventional means such as welding. The inwardly spaced ends of each of the laterally extending boom members 313, 314 are pivotally supported on the vertical mast 300 by a vertically extending pivot shaft 324 which extends through the two vertically extending elements 303, 304 as shown in FIG. 16. The upper end of the pivot shaft 324 is connected to an inwardly extended end 325 of the boom upper frame member 315.

A releasable holding mechanism is provided between the vertical support mast 300 and a lower end of the boom structures 313, 314. The releasable holding means includes a first rotatable element 326 rotatably supported in a downwardly projecting end of the pivot shaft 324. The rotatable member 326 includes a connecting bracket 327 which terminates in a yoke type pivot support means, including a pair of pivot support members 328, 329. The pivot support members 328 and 329 are pivotally attached to the inwardly extended end of the lower frame member 315, by means of a fore and aft pivot bolt 330. Spaced on the pivot shaft 324 immediately above the rotatable member 326 is a second rotatable member 331. Rotatable members 326, 327 are maintained in a position on the pivot shaft 324 by a compression spring 332 and a threaded connected element 333. Thus, it is seen that the two rotatable members 326, 327 are biased together against the under side of the vertical mast member 302. As shown in FIG. 16 the first rotatable member 326 includes an upwardly projecting camming portion 334 detailed to be releasably held within a complimentary recess portion 335 on the second rotatable member. The compression spring 332, first rotatable member with cam means 334 and second rotatable member with recess notched portion 335 will provide a releasable holding means for maintaining the boom means in a laterally extending position, but will allow the laterally extending booms to pivot about the shaft 324 to move inwardly in response to a predetermined amount of pressure being applied to the laterally extending boom. Each of the laterally extending booms 313, 314 are provided with power means for moving the booms from the laterally extending operating position, inwardly to a substantially fore and aft transport position. The power control means includes a hydraulic cylinder 337 which is connected adjacent one end to a mounting bracket 338 fixed to the bottom mast connecting member 302. The cylinder 337 is connecting to the mounting bracket 338 by a readily removable pin element 339 which will allow the cylinder 337 to be easily removed therefrom as desired. The cylinder 337 includes a conventional piston rod 340 which has an extended end connected to an extending ear portion 341 on the second rotatable member 331. The hydraulic cylinder 337 includes conventional input output hydraulic supply lines for effecting operation of the hydraulic cylinder 337. Operation of the cylinder 337 will cause the piston rod 340 to reciprocate therein to provide movement of the laterally extending boom about the pivot shaft 324 to either move the boom from a laterally extending position inwardly to a fore and aft position or to move a boom from an inward fore and aft position to a laterally extending position.

As shown in FIG. 17, the fluid chemical supply system and the hydraulic motor drive means is slightly different from the above described fluid chemical and hydraulic handling system. The chemical supply system includes a tank 350 and the hydraulic system includes a tank 351. Fluid chemicals are delivered from the tank 350 by a supply line 352 to a conventional pump 353 which will develop a predetermined amount of pressure and transfer the fluid pressure along line 354 to a pressure regulator valve 355. The fluid chemicals are then transferred along a supply line 356 to a series of branch lines 357 which are connected to conventional valve control means 358. It is pointed out that independent valve means are provided for each of the spraying heads illustrated in FIG. 17. The fluid chemicals from the valves 358 are transferred along supply line 359 which extend along the frame work of the mast and boom supporting structure to deliver the fluid chemicals to the spraying heads 110. The spray heads 110 used in the spraying system of FIGS. 15–17 are identical to the spraying heads utilized and described herein above in previous embodiments. An over capacity line 360 is provided between the pressure regulator means 355 and the supply tank 350 for returning an over flow of fluid chemicals to the supply tank. As shown in FIG. 17 a fluid agitator line 361 is provided for transferring a portion of the fluid chemicals from each of the controlled valve 358 to an elongated agitator 362 for agitating the fluid chemicals contained within the supply tank 350. The agitator 362 is identical to the agitator 114 as described herewithin above.

OPERATION

The operation of the spraying system illustrated in FIGS. 1–9 is begun by hitching the trailer 10 to a towing vehicle by insertion of a conventional connecting pin through the towing hitch 26. After the hitch mechanism 26 has been connected the power take-off drive of the towing vehicle will be connected to the drive means, including the universal joint 206 and drive shaft 205. Next, the supply tank chemical portion 51 is filled with the desired chemical to be sprayed and the hydraulic fluid supply portion 52 is filled with conventional hydraulic fluid for use in the operation of the hydraulic drive motor 200. At the beginning of the operation, the support boom 100 will normally be held in a horizontal transport position with the boom locked by the mounting brackets 40 and retaining pin 42. The trailer and spraying system is then towed to the area in which a chemical spraying operation is desired and at this time the boom 100 is pivoted about pin 101 until the boom is in a substantially vertical position, as shown in FIG. 2 and at this time the locking pin 45 is inserted through the openings 44 in the upright frame member and two openings 104 in the boom bracket means 103 to retain the boom in the vertical operative position. The drive from the towing vehicle is now delivered through the power take-off drive means 204–205, etc., to the hydraulic pump 200 and to the chemical supply pump 55.

During operation of the hydraulic drive means, the hydraulic fluid will flow along the supply line 208 to the hydraulic pump 200 which will develop sufficient hydraulic operating pressure and delivered the same along the high pressure line 207 to the pressure regulator valve 213. The valve 213 is of conventional construction to allow the hydraulic pressure in the lines to be developed to a predetermined pressure for operation of the hydraulic motors 122. The desired amount of hydraulic pressure will then flow along supply line 214 supported on the edge of the trailer chassis and up along the brace member 35. The hydraulic fluid will then flow through the flexible connection 215 into the supply conduit 105 constructed as an integral part of the boom structure 100. After the hydraulic fluid has passed through the supply conduit 105 the hydraulic fluid will then be conveyed along a flexible branch supply line 217 to the hydraulic motor 122 for operation thereof. The fluid leaving the hydraulic motor will pass along a branch supply line 218 and will be returned to the hydraulic fluid reservoir along the boom supply conduit 106, the flexible hose connection 219, the return line 222 to the hydraulic fluid filter means 222, after which the hydraulic fluid will then be returned through a connection 223 to the hydraulic reservoir 52. It is pointed out that an overflow of hydraulic fluid which is not needed for the driving of the motors is returned along a line 224 directly to the fluid filter means 222 and to the hydraulic reservoir 52.

The above described flow of hydraulic fluid pressure will provide for the operation of the hydraulic motors 122 by allowing the hydraulic fluid under pressure to pass into the motor housing 121 through a supply port 139. The fluid under pressure will then enter the supply conduit 36 for passage into the supply chamber 134. The fluid entering the supply chamber 134 under pressure will then be conveyed in a direction transverse to the rotatable axis of the gear means 128, 132. As the hydraulic fluid under pressure passes between the enmeshing teeth of the gear means the hydraulic fluid will effect rotation of the gears about their rotatable axis. The exhausted hydraulic fluid will then enter the exhaust chamber 134 for passage into the exhaust conduit 137 and then into the above described fluid hydraulic return lines. It is apparent that rotation of the gear means 128, 132 by the fluid pressure, will effect a corresponding rotation of the sleeve member 142 to thereby rotate the impellar means 180 to develop the desired amount of air pressure over the outer surface of the diffusion chamber 170. The speed of the hydraulic motor 122 can be readily varied by adjusting the speed of the power take-off drive means from the towing vehicle which will in turn vary the speed of the hydraulic pump means 200.

After the hydraulic drive means including the pump 200 and hydraulic motors 122 have been initiated the spraying operation is now begun by delivering a supply of fluid chemicals to the dispensing nozzles 150. The power take-off drive means delivered to the hydraulic pump will also effect a drive of a fluid chemical pump means 55. The chemical fluid is delivered to the pump means 55 by a supply conduit 56 which is connected to the internal portion of the chemical supply tank 51 at a connection 57. The chemicals under pressure will then be delivered along a conduit 59 to a pressure regulator means 60. The pressure regulator means 60 is of conventional construction to allow the pressure in the chemical lines to be adjusted to a predetermined amount for producing a desirable chemical spraying operation. The overflow of fluid chemicals from the pressure regulator 60 is returned along a conduit 61 to the internal portion of the chemical supply tank 51. The desired amount of fluid chemicals for use in the spraying operation is delivered from the pressure regulator 60 along a supply conduit 63 to a valve means 64. The valve means 64 is operated by a conventional manual control handle 65 to allow the fluid chemicals to be conveyed along a supply conduit 66 through the branch conduit 67 to the fluid chemical dispensing nozzles 150. Fluid chemicals flowing into the chemical dispensing nozzle 150 will be dispensed into the diffusion chamber through the series of orifices 154, 155. Passage of the fluid chemicals through the orifices 154, 155 of the dispensing nozzle will be directed along an angle which is directed toward the rotary impellar means 180. The quantity of fluid chemicals which are dispensed into the diffusion chambers 160 will be directed by centrifugal force out through the diffusion screen member 170. The fluid chemicals passing through the diffusion screen member 170 will be divided into a diffused array of finely divided droplets of fluid chemicals and will be dispensed into the blast of air pressure developed over the outer surface of the diffusion chamber by the rotary impellar means 180. The blast of air will then carry the finely divided droplets of fluid chemicals outwardly from the spraying head in an orbital radial path of fog-like air containing chemicals. The quantity of fluid chemicals which are dispensed into the spraying heads can be varied by operation of the manual control handle 65 to alter the fluid chemical output from valve means 64.

The fluid chemicals contained in the supply tank chemical portion 51 is maintained in an agitated condition such that the fluid chemical will be properly mixed with any carrying agent used in the chemical spraying operation. The chemical in the supply tank 51 is agitated by means of an agitator 69 which is connected by a high pressure chemical line 68 to the pressure regulator valve 60. Chemicals under pressure passing along the lines 68 into the agitator 69 will be forced radially outward through the series of orifices 71 to create a swirling action around the agitator member 69 to thoroughly agitate any chemicals contained in the supply tank and surrounding the agitator member 69.

The operation of the spraying system described as a first modification and illustrated in FIGS. 10—12 will be substantially in the same manner as the above described first embodiment, with the only difference being the mode of transport of the chemical spraying system over the area in which the chemical spraying operation is to occur. The spray system support rig illustrated in FIGS. 10—12 is connected to a conventional three point hitch structure of a towing vehicle by insertion of conventional connecting means through the two bottom frame support members 255, 256, and through the upwardly displaced bracket member 264. As shown in FIGS. 13, 14 the spraying system of FIGS. 10—14 includes a chemical supply means 51, a hydraulic supply system 52, a chemical supply pump 55, and a hydraulic pump means 200 which are adapted to be driven by the conventional power take-off from the support vehicle in substantially the same manner as described above in the operation of the first embodiment. Reference is made to the above described operation of the first embodiment for the details of the operation of the spraying system of FIG. 10—14. It is pointed out that the spraying heads 110 which are supported on the support framework, illustrated particularly in FIGS. 10 and 11, are adjustable vertically along the support brackets 266, 267 by connecting bolts passing through openings 275 in the support brackets 273, 274 which are aligned with vertically space opening 70 in the two support brackets 266, 267. The chemical spraying heads 110 are also adjustable about a vertical axis which extends through the opening 281 in the plate members 280. Adjustment of the spraying heads about the vertical axis of the opening 281 is accomplished by rotating the brackets 113 and connecting bolts 283 within the arcuate slot 282 and then tightening the bolts 283 in the desired angularly set position. It is pointed out that the embodiment of the spraying system described above in FIGS. 1—9 also includes a similar angular adjustment means for the spraying heads 110, however, the details of the adjustment have not been illustrated and reference is made to the details of FIG. 11 for the particular angular adjustment.

The second modification of the spraying system, as illustrated in FIGS. 15 through 17, also operate in substantially the same manner as the two previous embodiments of spraying system. The main difference of the embodiment of FIGS. 15—17 is the manner in which the spraying heads are supported for a spraying operation. The spraying system of FIGS. 15—17 is particularly suited for spraying fluid chemicals over a relatively wide area for applying the chemicals to a crop such as cotton, tobacco, etc. The boom support structure including the laterally extending booms 313, 314 of FIGS. 15—17 are detailed for supporting the spraying heads 110 in laterally spaced relationship over a wide area and due to this wide supporting relationship it is necessary to provide means for rotating the laterally extending boom structure 313, 314 about vertical axis to a fore and aft for transport position for movement over the highways and through narrow gateways which would not permit the entrance of the booms in their laterally extending position. The booms 313, 314 are moved between their laterally extending position as shown in FIG. 15 and their four and aft transport position by means of the hydraulic cylinder means 347 which is detail to pivot the booms about their pivot support axis 324 by movement of the two plate members 331 and 336. It is pointed out that the pivotal support structure for supporting the booms in their laterally extending position include spring biased cam means 334, 335 for releasably holding the booms in their laterally extending positions. It is apparent that the booms can be released from their laterally extending position by applying a predetermined amount of pressure to the extended end of the boom structure. This releasable holding means is provided for preventing damage to the boom structure should the booms contact a rigid object during a spraying operation.

Since the components of the spraying system of FIGS. 15—17 including the spraying heads 110 and hydraulic drive means 120 is identical to the operation to the spraying head and hydraulic motor drive means of the first embodiment of FIGS. 1—10 reference is made to the above description of the operation thereof for a detail understanding of the spraying head and hydraulic drive means. It is noted that the chemical supply and hydraulic supply reservoir means of the embodiment of FIGS. 15—17 is slightly different from the embodiment of FIGS. 1—14 and that the control means is somewhat different. However, reference is made to the above description to the second embodiment for the details of the control means and the supply means.

It now becomes apparent that the illustrative embodiments described hereinabove is capable of obtaining the above stated objects and advantages. It is obvious that those persons skilled in the art may make modifications in the details of constructions without departing from the spirit of the invention which is to be limited only by the scope of the amended claims.

I claim:

1. In an improved spraying system for use in spraying fluid chemicals the improvement comprising in combination:
    a. supply means provided on said system for containing a supply of fluid chemicals;
    b. a rotatable driven spraying head including means for developing a stream of directed air pressure and an annular perforated diffusion member.
    c. means on said system for supporting said spraying head in a position for spraying said chemicals;
    d. a dispensing nozzle operatively associated with said spraying head for dispensing a quantity of fluid chemicals into said diffusion member to be directed by centrifugal force out through said diffusion member and into said stream of directed air pressure;
    e. pressure means operatively associated with said supply means and said nozzle and detailed for delivering a supply of fluid chemicals from said supply means to said nozzle;
    f. said spray head support means including movably mounted boom structure detailed for supporting a series of said spraying heads, said boom being constructed to include a pair of hydraulic supply conduits, said boom and supply conduits being fixed together in supported relationship such that the strength of said boom consists of the boom structure including hydraulic supply conduits; and
    g. said rotatable driven spray heads each including a hydraulic motor drive means.

2. In an improved spraying system for use in spraying fluid chemicals, the improvement comprising, in combination:
    a. supply means provided on said system for containing a supply of fluid chemicals;
    b. a rotatable driven spraying head including means for developing a stream of directed air pressure and an annular perforated diffusion member;
    c. means on said system for supporting said spraying head in a position for spraying said chemicals;
    d. a dispensing nozzle operatively associated with said spraying head for dispensing a quantity of fluid chemicals into said diffusion member to be directed by centrifugal force out through said diffusion member and into said stream of directed air pressure;
    e. pressure means operatively associated with said supply means and said nozzle and detailed for delivering a supply of fluid chemicals from said supply means to said nozzle;
    f. said spray head support means includes a movably mounted boom structure detailed for supporting a series of said spraying heads; and
    g. said spraying head mounting means including means supporting said spraying heads for selective adjustment about at least one axis.

3. An improved spraying system as described in claim 2 further characterized in that said rotatably driven spraying head includes a rotatable driven impeller means for directing said stream of air pressure and wherein said annular perforated diffusion member includes a substantially web like cylindrical screen member fixed to said impeller means in coaxial relationship such that said stream of air pressure is directed axially over the outer surface of said diffusion member.

4. An improved spraying system as described in claim 3 further characterized in that said rotatable impeller means includes a coaxially mounted driving member with said dispensing nozzle coaxially mounted relative to and extending through said driving member and said rotatable impeller means.

5. An improved spraying system as described in claim 4 further characterized in that said rotatable driving member includes a sleeve extending through said driving member and having one end connected to said rotatable impeller means.

6. An improved spraying system as described in claim 5 further characterized in that said rotatable driving member includes a first gear operatively supported on said sleeve member for effecting rotation thereof, a second gear supported in meshing relationship relative to said first gear and fluid pressure supply means operatively associated with said first and second gear means for delivering a supply of hydraulic pressure to said first and second gear means at a point adjacent to said meshing relationship and in a direction transverse to the rotatable axis of said gear means.

7. An improved spraying system as described in claim 3 further characterized in that said dispensing nozzle includes an elongated tubular member having a closed extended end, with the opposite end of said tubular member in flow communication with a supply of fluid chemicals, and wherein said elongated tubular member includes a series of radially directed orifices.

8. An improved spraying system as described in claim 7 further characterized in that said radially directed orifices are angularly disposed relative to the elongated axis of said tubular member, and wherein said angularly disposed orifices are directed away from said closed tubular end.

9. An improved spraying system as described in claim 8 further characterized in that said orifices are axially spaced along said elongated tubular member and wherein said orifices adjacent said closed end are of a first diameter and said orifices spaced from said closed end are of a second and larger diameter.

10. An improved spraying head for use in a spraying system comprising, in combination:
    a. an impeller means rotatably mounted on said spraying head and detailed for developing directed streams of air pressure;
    b. an annular perforated diffusion member supported on said impeller such that said directed streams of air pressure pass axially over the outer surface of said diffusion member;
    c. a dispensing nozzle including an elongated tubular member having a closed end with an opposite end in flow communication with a supply of fluid chemicals, said dispensing nozzle including a series of radially extending orifices detailed for dispensing a supply of fluid chemicals into said diffusion member to be directed by centrifugal force out through said annular perforated diffusion member and into said streams of air pressure;
    d. means mounting said dispensing nozzle on said spraying head in such a manner that said dispensing nozzle is coaxial with and extends through said rotatable impeller means; and
    e. said rotatable impeller means including a rotatable driving member coaxially mounted relative to said rotatable impeller means.

11. An improved spraying head as in claim 10, further characterized in that said dispensing nozzle is supported in coaxial relationship with and extends through said rotatable driving member.

12. An improved spraying head as in claim 11 further characterized in that said rotatable driving member includes an elongated sleeve having said impeller means fixed to one end of said sleeve.

13. An improved spraying head as in claim 12 further characterized in that said rotatable driving member includes a first gear operatively associated with said sleeve for effecting rotation thereof, a second gear supported in meshing relationship with said first gear, and a supply of hydraulic fluid pressure means operatively associated with said first and second gear means and detailed in such a manner that said fluid pressure is delivered to said first and second gear means at a point adjacent to said meshing relationship and in a direction substantially transverse to the axes of rotation of said first and second gears.

14. An improved spraying head as in claim 10 further characterized in that each of said orifices includes an axis of fluid passage and said axes of fluid passage are angularly disposed relative to the longitudinal axis of said nozzle, and wherein said orifice axes are directed away from said nozzle closed end.

15. An improved spraying head as in claim 10 further characterized in that said series of orifices are axially spaced relative to each other along said elongated tubular member and wherein said orifices adjacent to said closed end are of smaller diameter than those spaced from said closed end.

16. An improved spraying system as in claim 2 further characterized in that said spraying head includes a rotatably driven impeller means, a hydraulic motor for effecting rotation of said rotatably driven impeller means a hydraulic pump operatively associated with said hydraulic motor for delivering a supply of hydraulic fluid under pressure to said motor means and a reservoir means for containing a supply of hydraulic fluid operatively associated with said hydraulic pump, and wherein said hydraulic reservoir means and said chemical supply means are constructed as an integrally formed tank having a hydraulic supply chamber and a chemical supply chamber.

17. An improved spraying system as in claim 16 further characterized in that said integrally formed tank is constructed as an elongated cylindrical member having closed opposite ends and wherein a separating wall is provided in said elongated cylindrical member in spaced relationship relative to one of said closed ends for dividing said tank into said chemical supply chamber and said hydraulic fluid supply chamber.

18. An improved spraying system as in claim 16 further characterized in that said hydraulic pump means and said chemical pressure supply means include remote control means for effecting operation thereof.

19. In an improved spraying system for use in spraying fluid chemicals, the improvement comprising; in combination:
 a. supply means provided on said system for containing a supply of fluid chemicals;
 b. a rotatable driven spraying head including means for developing streams of directed air pressure and an annular perforated diffusion member;
 c. means on said system for supporting said spraying head in a position for spraying said chemicals;
 d. a dispensing nozzle operatively associated with said spraying head for dispensing a quantity of fluid chemicals into said diffusion member to be directed by centrifugal force out through said diffusion member and into said stream of directed air pressure;
 e. pressure means operatively associated with said supply means and said nozzle and detailed for delivering a supply of fluid chemicals from said supply means to said nozzle,
 f. said spraying system being mounted on a support framework adapted to be connected to a three point hitch means on a conventional tractor, said support framework including a base frame means for supporting said supply of fluid chemicals, a pair of laterally spaced and forwardly projecting connecting members detailed for receiving connectable elements for attaching said base frame to certain axes of said three point hitch means of a support vehicle, retaining means detailed for surrounding said chemical supply means for maintaining said chemical supply means in position on said base frame means, said retaining means including a forwardly projecting hitch member, said forwardly projecting hitch member being vertically spaced relative to said base frame and detailed for receiving a connectable element for attaching said hitch member to a certain other one said three point hitch means and means operatively associated with said support framework for supporting said spraying head.

20. An improved spraying system as in claim 19 further characterized in that said chemical supply retaining means includes a forwardly projecting support member detailed for supporting remote control means in a position adjacent an operations platform.

21. An improved spraying system as in claim 19 further characterized in that said spraying head support means includes adjustable means for supporting said spraying head in a plurality of selected vertically spaced positions.

22. A spraying system as in claim 21 further characterized in that said spraying head is supported on said support means for adjustment about a substantially vertical axis.

23. An improved spraying system as in claim 19 further characterized in that said spraying system includes a pair of oppositely directed spraying heads supported on said spraying head support means.

* * * * *